United States Patent
Nandagopal et al.

(10) Patent No.: US 10,061,797 B2
(45) Date of Patent: Aug. 28, 2018

(54) EVALUATING LIKELY ACCURACY OF METADATA RECEIVED FROM SOCIAL NETWORKING SYSTEM USERS BASED ON USER CHARACTERISTICS

(71) Applicant: Facebook, Inc., Willow Park, CA (US)

(72) Inventors: Venkataramanan Iyer Nandagopal, Sunnyvale, CA (US); Clayton Allen Andrews, Mountain View, CA (US); Omid Rouhani-Kalleh, Mountain View, CA (US); Julian Martin Eisenschlos, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 384 days.

(21) Appl. No.: 14/742,639

(22) Filed: Jun. 17, 2015

(65) Prior Publication Data

US 2016/0371320 A1 Dec. 22, 2016

(51) Int. Cl.
 *G06F 17/30* (2006.01)
(52) U.S. Cl.
 CPC .. *G06F 17/30371* (2013.01); *G06F 17/30876* (2013.01)
(58) Field of Classification Search
 CPC .............. G06F 17/30371; G06F 17/30876
 See application file for complete search history.

(56) References Cited

U.S. PATENT DOCUMENTS

| | | | | |
|---|---|---|---|---|
| 8,082,235 B1* | 12/2011 | Dasilva | ............ | G06F 17/30817 707/691 |
| 8,626,753 B1* | 1/2014 | Aggarwal | ......... | G06F 17/30864 707/723 |
| 8,806,598 B2* | 8/2014 | Assam | .................... | H04L 63/08 726/7 |
| 9,305,119 B1* | 4/2016 | Partovi | ............ | G06F 17/30038 |
| 2008/0319827 A1* | 12/2008 | Yee | ........................ | G06Q 30/02 705/7.29 |
| 2009/0254499 A1* | 10/2009 | Deyo | ..................... | G06Q 10/10 706/12 |
| 2010/0082640 A1* | 4/2010 | Wexler | ............. | G06F 17/30867 707/748 |
| 2010/0250347 A1* | 9/2010 | Rainier | .................. | G06Q 30/02 705/14.4 |
| 2010/0257183 A1* | 10/2010 | Kim | ........................ | G06Q 10/10 707/748 |

(Continued)

*Primary Examiner* — Jared M Bibbee
(74) *Attorney, Agent, or Firm* — Fenwick & West LLP

(57) ABSTRACT

A social networking system allows its users to provide metadata for association with objects maintained by the social networking system. Some of the metadata may be presented to other users along with the object. To prevent association of inaccurate metadata with an object, the social networking system determines a confidence value associated with a user who provided metadata for association with an object. The confidence value indicates of the accuracy of metadata provided by the user relative to information associated with the object. If the user has previously provided less than a threshold amount of metadata to associate with objects, the confidence score is determined using characteristics associated with the user by the social networking system. The metadata provided by the user is stored but not associated with the object if the user's confidence value is less than a threshold value.

20 Claims, 2 Drawing Sheets

(56) References Cited

U.S. PATENT DOCUMENTS

| | | | |
|---|---|---|---|
| 2012/0084226 A1* | 4/2012 | Murdock | G06Q 10/10 705/347 |
| 2012/0084302 A1* | 4/2012 | Murdock | G06F 17/30241 707/754 |
| 2013/0080427 A1* | 3/2013 | Cross | G06F 17/30648 707/728 |
| 2014/0019443 A1* | 1/2014 | Golshan | G06F 17/30867 707/723 |

* cited by examiner

EVALUATING LIKELY ACCURACY OF METADATA RECEIVED FROM SOCIAL NETWORKING SYSTEM USERS BASED ON USER CHARACTERISTICS

BACKGROUND

This disclosure relates generally to maintaining objects at a social networking system, and more specifically to associating metadata received from social networking system users with an object.

Social networking systems allow their users to easily connect to and communicate with other users. A social networking system may maintain objects that correspond to content associated with different types of content. For example, an object identifies content associated with a page for an entity, content associated with a group of users, or content associated with an event. Information associated with an object may be presented to users of the social networking system to provide information to the users.

Additionally, users of the social networking system may provide metadata for association with an object to describe characteristics of the object. For example, the metadata identifies a location associated with the object. To prevent users from providing inaccurate metadata for association with an object, when the social networking system receives metadata for association with an object form a user, the social networking system assesses the reliability of the user. Conventional social networking systems determine the reliability of a user based on metadata previously provided by the user for association with other objects. The previously provided metadata may be compared to metadata received form additional users for association with the object or by presenting the previously provided metadata to other users for verification. However, these conventional social networking systems are unable to evaluate the reliability of metadata received from users who have not previously provided metadata to the social networking system for association with objects or who have previously provided a small amount of metadata for association with objects.

SUMMARY

A social networking system maintains various objects, each associated with content. For example, an object represents a page associated with an entity, an event, or a group. Users of the social networking system may provide metadata to the social networking system for association with an object. The metadata describes one or more characteristics of the object (e.g., a location associated with the object). When additional users subsequently access content associated with the object, a portion of the metadata provided by the user may be presented to the additional users.

To prevent inaccurate or malicious metadata from being associated with an object by a user, when the social networking system receives metadata from the user for association with the object, a confidence value associated with the user is determined by the social networking system. The confidence value associated with a user provides a measure of the accuracy of metadata provided by the user relative to information associated with the object. When determining the confidence value, the social networking system determines if the user has previously provided at least a threshold amount of metadata to the social networking system for association with one or more objects based on prior interactions where the user provided metadata to the social networking system for association with an object. If the user previously provided at least the threshold amount of metadata to the social networking system for association with one or more objects, the social networking system determines the confidence value associated with the user based on the metadata previously received from the user for association with one or more objects. For example, the confidence value is based on an amount of the metadata previously received from the user for association with one or more objects matching metadata associated with the one or more objects by additional users. As another example, the confidence value is based on an amount of metadata received from the user for association with objects that is validated or verified by one or more additional users to whom the metadata is presented.

However, if the user has not previously provided at least the threshold amount of metadata to the social networking system, the confidence value associated with the user is unable to be accurately determined by the social networking system based on the metadata previously provided to the social networking system by the user. To determine the confidence value associated with the user if the user has not previously provided at least the threshold amount of metadata to the social networking system for association with one or more objects, the social networking system identifies characteristics associated with the user, and calculates the confidence value based on the characteristics associated with the user. Example characteristics of the user include: demographic information associated with the user via a user profile, one or more interests specified by the user and stored in the user profile, connections between the user and other users of the social networking system, one or more interests of the user, an employment history of the user, interactions between the user and the object, and one or more interactions between the user and content having at least a threshold measure of similarity with the object. The social networking system may apply one or more machine-learned models to the characteristics associated with the user to determine the confidence value associated with the user. A machine-learned model may be applied to characteristics associated with the user as well as to characteristics associated with additional users. For example, the social networking system compares characteristics of the user to characteristics of additional users who provided metadata that is associated with the object (or with objects having at least a threshold similarity to the object) and who are associated with at least a threshold confidence value. Based on the similarity between characteristics associated with the user and characteristics of the additional users, the social networking system calculates the confidence value associated with the user.

If the confidence value associated with the user has at least a threshold value, the social networking system stores the metadata form the user and associates the metadata with the object, allowing the metadata to be subsequently presented to additional users who access the object. However, if the confidence value associated with the user is less than the threshold value, the social networking system stores the metadata received from the user but does not associate the metadata with the object. As the user provides metadata for association with additional objects to the social networking system, the social networking system modifies the confidence value associated with the user. If the modified confidence value associated with the user equals or exceeds the threshold value, the social networking system associates the stored metadata with the object. In some embodiments, the confidence value is modified after the social networking system has received a threshold amount of metadata from the user for association with one or more objects. Alternatively, the social networking system modifies the confidence value associated with the user as the social networking system receives metadata for association with objects maintained by the social networking system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
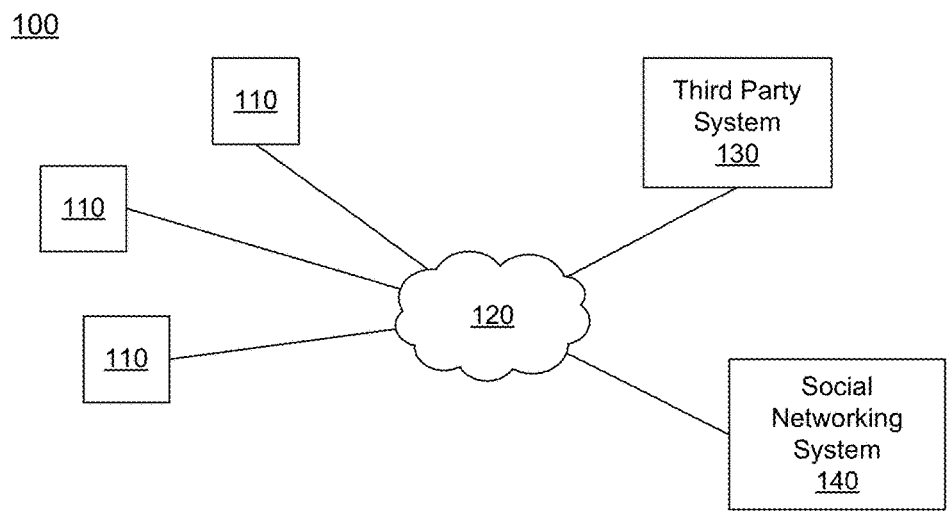
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, information describing a group of users of the social networking system 140, or information about an application provided by the third party system 130. In some embodiments, a third party system 130 may communicate information directly to the social networking system 140.

Figure 2:
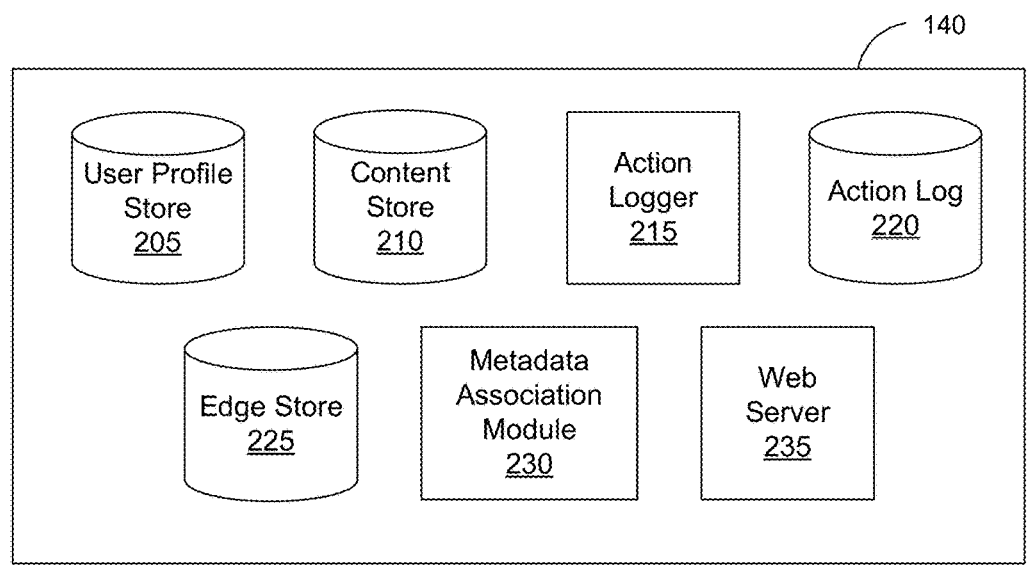
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a metadata association module 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture. In other embodiments, the functionality described herein may be adapted for use by online systems other than social networking systems 140.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220. In some embodiments, a third party system 130 may indirectly retrieve information from the user profile store 205, subject to one or more privacy settings associated with a user profile by a user, to identify a user profile in the user profile store 205 associated with a user of the third party system 130.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

Users of the social networking system 140 may provide metadata associated with an object to the social networking system 140, which associates the metadata with the content item. The social networking system 140 may subsequently present at least a portion of the metadata along with content associated with the object to additional users of the social networking system 140. Metadata associated with an object by the user describes one or more attributes of the object. For example, a user provides a location associated with an object corresponding to an event, and the social networking system 140 presents the location when additional users request content associated with the event. However, to prevent users from providing inaccurate metadata for association with an object, the social networking system 140 determines a confidence value associated with the user and determines whether to associate the received metadata with the object based at least in part on the confidence value. The confidence value provides a measure of the accuracy of metadata provided by the user relative to information associated with the object. For example, the metadata association module 230 determines a confidence value associated with a user, as further described below, when the social networking system 140 receives metadata for association with an object from the user.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, commenting on a content item, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of an social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The metadata association module 230 determines a confidence value associated with a user when the social networking system 140 receives metadata from the user for association with an object maintained in the content store 210. A confidence value associated with a user provides a measure of the accuracy of metadata provided by the user relative to information associated with the object. When determining the confidence value associated with a user, the metadata association module 230 retrieves information from the action log 220 and the content store 210 identifying prior interactions where the user provided metadata to the social networking system 140 for association with one or more objects. To prevent association of incorrect metadata with an object, after receiving metadata form the user for association with an object, the metadata association module 230 determines, based on prior interactions where the user provided metadata to the social networking system 140 for association with an object, if the user has previously provided at least a threshold amount of metadata to the social networking system 140 for association with one or more objects.

If the user previously provided at least the threshold amount of metadata to the social networking system 140 for association with one or more objects, the metadata association module 230 determines the confidence value associated with the user based on the metadata previously received from the user for association with one or more objects. For example, the confidence value is based on an amount of the metadata previously received from the user for association with one or more objects matching metadata associated with the one or more objects by additional users. As another example, the confidence value is based on an amount of metadata received from the user for association with objects that is validated or verified by one or more additional users to whom the metadata is presented.

However, if the user has not previously provided at least the threshold amount of metadata to the social networking system 140, the metadata association module 230 is unable to accurately determine the confidence value associated with the user based on the metadata previously provided to the social networking system 140 by the user. To determine the confidence value associated with a user who has not previously provided at least the threshold amount of metadata to the social networking system 140 for association with one or more objects, the metadata association module 230 identifies characteristics associated with the user by the social networking system 140. For example, demographic information associated with the user via a user profile, one or more interests specified by the user and stored in the user profile, connections between the user and other users of the social networking system 140, one or more interests of the user, an employment history of the user, interactions between the user and the object, and one or more interactions between the user and content having at least a threshold measure of similarity with the object. Based on the characteristics associated with the user, the metadata association module 230 calculates the confidence value associated with the user. For example, the metadata association module 230 compares characteristics of the user to characteristics of additional users who provided metadata that is associated with the object (or with objects having at least a threshold similarity to the object) and who are associated with at least a threshold confidence value. Based on the similarity between characteristics associated with the user and characteristics of the additional users, the metadata association module 230 calculates the confidence value associated with the user. Calculation of a confidence value associated with the user is further described below in conjunction with FIG. 3.

If the confidence value associated with the user has at least a threshold value, the metadata association module 230 associates metadata received from the user with the object, allowing the metadata to be subsequently presented to additional users who access the object. However, if the confidence value associated with the user is less than the threshold value, the metadata association module 230 stores the metadata without associating the metadata with the object. As the user provides metadata for association with additional objects, the metadata association module 230 modifies the confidence value associated with the user. If the confidence value associated with the user equals or exceeds the threshold value, the metadata association module 230 associates the stored metadata with the object. Association of metadata with an object is further described below in conjunction with FIG. 3.

The web server 235 links the social networking system 140 via the network 120 to the one or more client devices 110, as well as to the one or more third party systems 130. In some embodiments, the web server 235 links the social networking system 140 directly ton one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
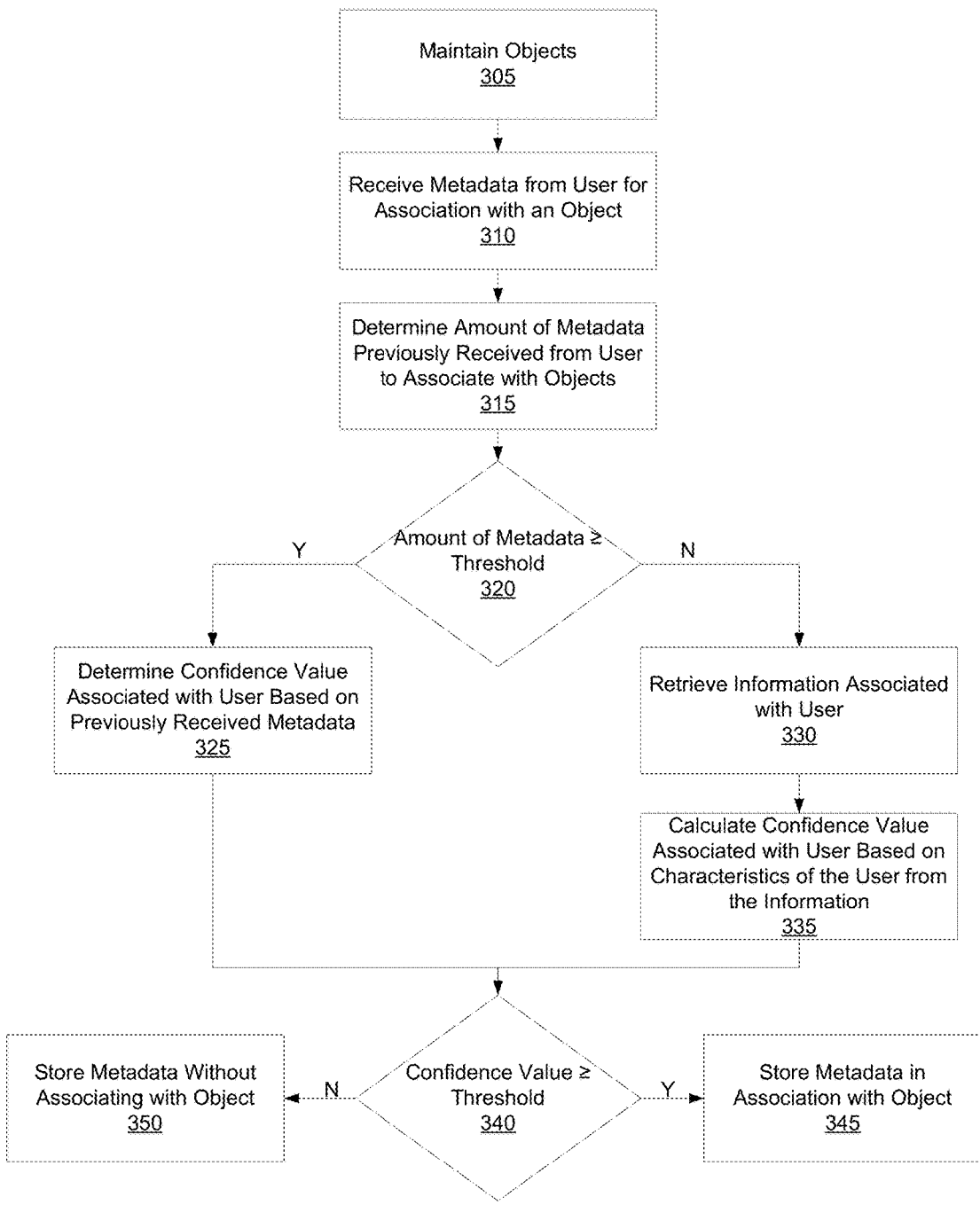
FIG. 3 is a flow chart of a method for determining whether to associate metadata received from a user with an object maintained by the social networking system, in accordance with an embodiment.

Determining Whether to Associate Metadata with a Social Networking System Object FIG. 3 is a flow chart of a method for determining whether to associate metadata received from a user with an object maintained by the social networking system 140. In other embodiments, the method may include different and/or additional steps than those described in conjunction with FIG. 3. Additionally, in some embodiments, the method may perform the steps described in conjunction with FIG. 3 in different orders.

The social networking system 140 maintains 305 various objects. Each object corresponds to content maintained by the social networking system 140, as further described above in conjunction with FIG. 2. For example, an object includes content associated with an entity (e.g., a business, an organization), content associated with an event, or content associated with a location. Metadata is associated with one or more of the objects and describes attributes of the object. Users of the social networking system 140 may provide metadata for association with an object, and the social networking system 140 may associate metadata received from a user with an object to provide additional information about the object.

To prevent associating inaccurate metadata with an object, when the social networking system 140 receives 310 metadata from a user to associate with the object, the social networking system 140 determines 315 an amount of metadata that the social networking system 140 previously received from the user that the social networking system 140 associated with one or more objects. Based on metadata that the user previously provided to the social networking system 140 for association with one or more objects, the social networking system 140 may determine a confidence value associated with the user. The confidence value provides a measure of the accuracy of metadata provided by the user relative to information associated with the object. For example, the measure of confidence is proportional to a number of additional users providing metadata associated with the object matching or similar to the metadata received 310 from the user.

However, if the user has infrequently provided metadata to the social networking system 140 for association with one or more objects, the social networking system 140 is unable to accurately determine the confidence value associated with the user. Accordingly, the social networking system 140 determines 315 an amount of metadata previously received from the user for association with one or more objects maintained by the social networking system 140. For example, the social networking system 140 determines 315 a number of times metadata for association with one or more objects has been received from the user, determines 315 a number of objects with which the user previously associated metadata, determines 315 a number of items of metadata previously received from the user and associated with one or more objects, or determines 315 any suitable information describing an amount of metadata previously received by the social networking system 140 from the user for association with one or more objects.

The social networking system determines 320 whether the amount of metadata previously received from the user for association with one or more objects equals or exceeds a threshold amount of metadata. If the social networking system 140 previously received at least the threshold amount of metadata for association with one or more objects, the social networking system 140 determines 325 the confidence value associated with the user based on the metadata previously received from the user. For example, the social networking system 140 compares metadata previously received from the user for association with objects to previously received metadata from additional users for association with objects. The confidence value associated with the user is then determined 325 based on an amount of metadata received from the user for association with an object that matches metadata received from one or more additional users for association with the object.

However, if the social networking system 140 previously received less than the threshold amount of metadata for association with one or more objects from the user, the social networking system 140 is unable to accurately determine the confidence value associated with the user from the metadata previously received from the user. To determine whether to associate the metadata received 310 from the user with the object when the social networking system 140 has previously received less than the threshold amount of metadata for association with objects, the social networking system 140 retrieves 330 information associated with the user by the social networking system 140. Examples of information associated with the user include: demographic information (e.g., age, gender, location), connections between the user and other users of the social networking system 140, one or more interests of the user, an employment history of the user, interactions between the user and the object, and one or more interactions by the user with content having at least a threshold measure of similarity with the object.

Based on the retrieved information associated with the user, the social networking system 140 identifies characteristics of the user and calculates 335 the confidence value associated with the user based on the characteristics. In various embodiments, the social networking system 140 applies one or more machine learned models to the identified characteristics to calculate 335 the confidence value associated with the user. For example, the social networking system 140 compares characteristics of the user to characteristics of additional users who provided metadata that is associated with the object (or with objects having at least a threshold similarity to the object) and who are associated with at least a threshold confidence value. In the preceding example, the confidence value associated with the user may be proportional to an amount of similarity between characteristics of the user and characteristics of the additional users. Hence, if the social networking system 140 has not previously received sufficient metadata from the user for association with one or more objects to determine 325 the confidence value associated with the user, the social networking system 140 calculates 335 the confidence value associated with the user based on characteristics of the user.

The social networking system 140 determines 340 whether the confidence value associated with the user equals or exceeds a threshold value. If the confidence value associated with the user equals or exceeds the threshold value, the social networking system 140 stores 345 the metadata received 310 from the user in association with the object. However, if the confidence value associated with the user is less than the threshold value, the social networking system 140 stores 350 the metadata received from the user but does not associate the metadata received 310 from the user with the object. For example, the social networking system 140 stores the metadata and information identifying the object, but does not associate the metadata with the object itself. Preventing association of metadata received from users associated with less than a threshold confidence value prevents the social networking system 140 from associating potentially inaccurate metadata with the object.

If the social networking system 140 stores 350 the metadata received from the user without associating the metadata with the object, the metadata may be subsequently associated with the object if the confidence value associated with the user increases to equal or exceed the threshold value. As the social networking system 140 receives additional metadata from the user for association with one or more objects, the social networking system 140 modifies the confidence value associated with the user. For example, if additional metadata received from the user associated with one or more objects matches metadata received form additional users associated with the one or more objects, the social networking system 140 increases the confidence value associated with the user. An amount by which the confidence value associated with the user is increased may be based on an amount of additional metadata received from the user for association with one or more objects matches metadata associated with the one or more objects by additional users. As another example, metadata associated with an additional object received form the user is presented to additional users, and the confidence value associated with the user is increased based on a number of additional users who verify the metadata received from the user.

Alternatively, when the social networking system 140 receives at least the threshold amount of metadata for association with one or more objects from the user, the social networking system 140 modifies the confidence value associated with the user based on the received metadata. For example, the received metadata for association with one or more objects is compared to additional metadata for association with one or more additional users received from one or more additional users and the confidence value associated with the user is increased if the metadata received from the user matches additional metadata received from one or more additional users. Alternatively, metadata received from the user for association with one or more objects is presented to additional users, and the social networking system 140 increases the confidence value associated with the user based on a number or a percentage of the additional users who verify the metadata received from the user.

Additionally, the social networking system 140 may modify the confidence value associated with the user based on metadata received from one or more additional users for association with the object. In one embodiment, if metadata received from one or more additional users for association with the object matches metadata received form the user for association with the object, the social networking system 140 modifies the confidence value associated with the user by increasing the confidence value. For example, if at least a threshold number or percentage of additional users provide the social networking system with metadata for association with the object matching metadata received from the user for association with the object, the social networking system 140 increases the confidence value associated with the user.

Hence, the social networking system 140 may subsequently associated stored metadata received from the user with the object when the confidence value associated with the user is modified to have at least the threshold value. This allows the user to provide metadata for association with the object while also allowing the social networking system 140 to withhold associating the metadata with the object until the social networking system 140 determines that the metadata received 310 from the user has at least a threshold likelihood of being accurate.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:
1. A computer-implemented method comprising:
receiving, at a social networking system from a user via a client device, metadata associated with a target object maintained by the social networking system;

determining an amount of metadata previously received from the user and associated with one or more stored objects maintained by the social networking system;

retrieving characteristics of the user derived from information stored by the social networking system if the amount of metadata previously received from the user is less than a threshold amount of metadata;

identifying additional users of the social networking system having respective confidence values of at least a threshold confidence value, wherein the respective confidence values represent measures of accuracy of metadata provided by the respective additional users in association with the one or more objects maintained by the social networking system;

comparing the characteristics of the user to characteristics of the identified additional users;

calculating a confidence value associated with the user based on a similarity between the characteristics of the user and the characteristics of the identified additional users; and storing the metadata in association with the object if the confidence value associated with the user exceeds the threshold confidence value.

2. The computer-implemented method of claim 1, further comprising:

storing the metadata without associating the metadata with the object if the confidence value associated with the user is less than the threshold value.

3. The computer-implemented method of claim 1, further comprising:

calculating the confidence value associated with the user based on metadata previously received from the user for association with one or more objects maintained by the social networking system if the social networking system has previously received less than the threshold amount of metadata for association associated with one or more objects maintained by the social networking system from the user.

4. The computer-implemented method of claim 1, further comprising:

receiving at least the threshold amount of metadata associated with one or more objects maintained by the social networking system from the user; and modifying the confidence value based at least on the threshold amount of metadata associated with one or more objects maintained by the social networking system from the user; and associating the metadata received from the user with the object if the modified confidence value equals or exceeds the threshold value.

5. The computer-implemented method of claim 1, further comprising:

receiving metadata associated with the object from one or more additional users matching the metadata associated with the object received from the user; and modifying the confidence value associated with the user based on the metadata received from the one or more additional users.

6. The computer-implemented method of claim 5, wherein modifying the confidence value associated with the user based on the metadata received from the one or more additional users comprises:

increasing the confidence value associated with the user if metadata received from at least a threshold number of the additional users for association with the object matches the metadata associated with the object received from the user.

7. The computer-implemented method of claim 1, further comprising:

receiving additional metadata for association with one or more objects from the user; and presenting the additional metadata to one or more additional users; and increasing the confidence value associated with the user if one or more of the additional users verify the additional metadata received from the user.

8. The computer-implemented method of claim 1, wherein the characteristics of the user are selected from a group consisting of: demographic information associated with the user, one or more interests of the user, an employment history of the user, one or more interactions by the user with content having at least a threshold measure of similarity with the object, and any combination thereof.

9. A computer program product comprising a non-transitory computer readable storage medium having instructions encoded thereon that, when executed by a processor, cause the processor to perform steps including:

receiving, at a social networking system from a user via a client device, metadata associated with a target object maintained by the social networking system;

determining an amount of metadata previously received from the user and associated with one or more stored objects maintained by the social networking system;

retrieving characteristics of the user derived from information stored by the social networking system if the amount of metadata previously received from the user is less than a threshold amount of metadata;

identifying additional users of the social networking system having respective confidence values of at least a threshold confidence value, wherein the respective confidence values represent measures of accuracy of metadata provided by the respective additional users in association with the one or more objects maintained by the social networking system;

comparing the characteristics of the user to characteristics of the identified additional users;

calculating a confidence value associated with the user based on a similarity between the characteristics of the user and the characteristics of the identified additional users; and storing the metadata in association with the object if the confidence value associated with the user exceeds the threshold confidence value.

10. The computer program product of claim 9, wherein the non-transitory computer-readable storage medium further includes instructions encoded thereon that when executed by the processor cause the processor to perform steps including:

storing the metadata without associating the metadata with the object if the confidence value associated with the user is less than the threshold value.

11. The computer program product of claim 9, wherein the non-transitory computer-readable storage medium further includes instructions encoded thereon that when executed by the processor cause the processor to perform steps including:

calculating the confidence value associated with the user based on metadata previously received from the user for association with one or more objects maintained by the social networking system if the social networking system has previously received less than the threshold amount of metadata for association associated with one or more objects maintained by the social networking system from the user.

12. The computer program product of claim 9, wherein the non-transitory computer-readable storage medium further includes instructions encoded thereon that when executed by the processor cause the processor to perform steps including:
   receiving at least the threshold amount of metadata associated with one or more objects maintained by the social networking system from the user; and
   modifying the confidence value based at least on the threshold amount of metadata associated with one or more objects maintained by the social networking system from the user; and
   associating the metadata received from the user with the object if the modified confidence value equals or exceeds the threshold value.

13. The computer program product of claim 9, wherein the non-transitory computer-readable storage medium further includes instructions encoded thereon that when executed by the processor cause the processor to perform steps including:
   receiving metadata associated with the object from one or more additional users matching the metadata associated with the object received from the user; and
   modifying the confidence value associated with the user based on the metadata received from the one or more additional users.

14. The computer program product of claim 13, wherein modifying the confidence value associated with the user based on the metadata received from the one or more additional users comprises:
   increasing the confidence value associated with the user if metadata received from at least a threshold number of the additional users for association with the object matches the metadata associated with the object received from the user.

15. The computer program product of claim 9, wherein the non-transitory computer-readable storage medium further includes instructions encoded thereon that when executed by the processor cause the processor to perform steps including:
   receiving additional metadata for association with one or more objects from the user; and
   presenting the additional metadata to one or more additional users; and
   increasing the confidence value associated with the user if one or more of the additional users verify the additional metadata received from the user.

16. The computer program product of claim 9, wherein the characteristics of the user are selected from a group consisting of: demographic information associated with the user, one or more interests of the user, an employment history of the user, one or more interactions by the user with content having at least a threshold measure of similarity with the object, and any combination thereof.

17. A computer system comprising:
   a processor; and
   a non-transitory computer readable storage medium having instructions encoded thereon that, when executed by the processor, cause the processor to perform steps including:
      receiving, at a social networking system from a user via a client device, metadata associated with a target object maintained by the social networking system;
      determining an amount of metadata previously received from the user and associated with one or more stored objects maintained by the social networking system;
      retrieving characteristics of the user derived from information stored by the social networking system if the amount of metadata previously received from the user is less than a threshold amount of metadata;
      identifying additional users of the social networking system having respective confidence values of at least a threshold confidence value, wherein the respective confidence values represent measures of accuracy of metadata provided by the respective additional users in association with the one or more objects maintained by the social networking system;
      comparing the characteristics of the user to characteristics of the identified additional users;
      calculating a confidence value associated with the user based on a similarity between the characteristics of the user and the characteristics of the identified additional users; and
      storing the metadata in association with the object if the confidence value associated with the user exceeds the threshold confidence value.

18. The computer system of claim 17, wherein the non-transitory computer-readable storage medium further includes instructions encoded thereon that when executed by the processor cause the processor to perform steps including:
   storing the metadata without associating the metadata with the object if the confidence value associated with the user is less than the threshold value.

19. The computer system of claim 17, wherein the non-transitory computer-readable storage medium further includes instructions encoded thereon that when executed by the processor cause the processor to perform steps including:
   calculating the confidence value associated with the user based on metadata previously received from the user for association with one or more objects maintained by the social networking system if the social networking system has previously received less than the threshold amount of metadata for association associated with one or more objects maintained by the social networking system from the user.

20. The computer system of claim 17, wherein the non-transitory computer-readable storage medium further includes instructions encoded thereon that when executed by the processor cause the processor to perform steps including:
   receiving at least the threshold amount of metadata associated with one or more objects maintained by the social networking system from the user; and
   modifying the confidence value based at least on the threshold amount of metadata associated with one or more objects maintained by the social networking system from the user; and
   associating the metadata received from the user with the object if the modified confidence value equals or exceeds the threshold value.

* * * * *